US010445394B2

(12) United States Patent
Vaideeswaran et al.

(10) Patent No.: US 10,445,394 B2
(45) Date of Patent: *Oct. 15, 2019

(54) RESOURCE LOCATOR REMARKETING

(71) Applicant: Google LLC, Mountain View, CA (US)

(72) Inventors: Jyotsna Vaideeswaran, San Jose, CA (US); Kamal Tiwari, Fremont, CA (US); Jayavel Shanmugasundaram, Santa Clara, CA (US); Hongjie Bai, Mountain View, CA (US)

(73) Assignee: Google LLC, Mountain View, CA (US)

( * ) Notice: Subject to any disclaimer, the term of this patent is extended or adjusted under 35 U.S.C. 154(b) by 387 days.

This patent is subject to a terminal disclaimer.

(21) Appl. No.: 15/353,031

(22) Filed: Nov. 16, 2016

(65) Prior Publication Data
US 2017/0132328 A1    May 11, 2017

Related U.S. Application Data

(63) Continuation of application No. 14/693,175, filed on Apr. 22, 2015, now Pat. No. 9,524,350, which is a (Continued)

(51) Int. Cl.
*G06F 16/955* (2019.01)
*H04L 29/08* (2006.01)
(Continued)

(52) U.S. Cl.
CPC .... *G06F 16/9566* (2019.01); *G06F 16/90344* (2019.01); *G06F 16/90348* (2019.01); (Continued)

(58) Field of Classification Search
CPC ......... G06F 16/90344; G06F 16/90348; G06F 16/95; G06F 16/951; G06F 16/9535; (Continued)

(56) References Cited

U.S. PATENT DOCUMENTS 8,131,737 B2    3/2012 Ramer
8,195,666 B2    6/2012 Jeavons
(Continued)

OTHER PUBLICATIONS

Transmittal of the International Search Report and the Written Opinion of the International Searching Authority for PCT/US2013/006139 dated Apr. 25, 2014, 13 pages.
(Continued)

*Primary Examiner* — Le H Luu
(74) *Attorney, Agent, or Firm* — Fish & Richardson P.C.

(57) ABSTRACT

Methods, systems, and apparatus for resource locator remarketing are presented. In one aspect, a method includes receiving visitation data from a publisher, the visitation data specifying a device identifier and a resource locator specifying a resource that was provided to a user device; identifying a content feed that includes regular expressions, each regular expression specifying matching character strings and a set of content items that are eligible to be provided to user devices corresponding to visitation data including a resource locator matching one of the regular expressions; identifying, a first matching regular expression that matches the resource locator specified by the visitation data; selecting a content item from the content items that correspond to the first matching regular expression; and providing data that causes presentation of the selected content item to the user device.

20 Claims, 6 Drawing Sheets

Related U.S. Application Data continuation of application No. 13/952,887, filed on Jul. 29, 2013, now Pat. No. 9,043,425.

(51) Int. Cl.

| | | |
|---|---|---|
| *G06Q 30/02* | (2012.01) | |
| *H04L 29/12* | (2006.01) | |
| *H04N 21/236* | (2011.01) | |
| *G06F 16/95* | (2019.01) | |
| *G06F 16/951* | (2019.01) | |
| *G06F 16/958* | (2019.01) | |
| *G06F 16/9535* | (2019.01) | |
| *G06F 16/903* | (2019.01) | |

(52) U.S. Cl.
CPC ............ *G06F 16/95* (2019.01); *G06F 16/951* (2019.01); *G06F 16/955* (2019.01); *G06F 16/958* (2019.01); *G06F 16/9535* (2019.01); *G06Q 30/0255* (2013.01); *G06Q 30/0256* (2013.01); *G06Q 30/0277* (2013.01); *H04L 61/15* (2013.01); *H04L 61/30* (2013.01); *H04L 67/02* (2013.01); *H04L 67/20* (2013.01); *H04L 67/22* (2013.01); *H04N 21/236* (2013.01); *G06F 2207/025* (2013.01)

(58) Field of Classification Search
CPC .. G06F 16/955; G06F 16/9566; G06F 16/958; G06F 2207/025; G06Q 30/0255; G06Q 30/0256; G06Q 30/0277; H04L 61/15; H04L 61/30; H04L 67/02; H04L 67/20; H04L 67/22; H04N 21/236
See application file for complete search history.

(56) References Cited

U.S. PATENT DOCUMENTS

| | | |
|---|---|---|
| 8,321,274 B2 | 11/2012 | Collins |
| 2002/0082923 A1 | 6/2002 | Merriman et al. |
| 2008/0172738 A1* | 7/2008 | Bates ............... G06F 21/64 726/22 |
| 2009/0204481 A1 | 8/2009 | Navar |
| 2010/0131902 A1* | 5/2010 | Teran ............ G06F 16/9535 715/843 |
| 2010/0161378 A1 | 6/2010 | Josifovski et al. |
| 2011/0035402 A1* | 2/2011 | Agrawal ............ G06F 16/951 707/769 |
| 2011/0154188 A1* | 6/2011 | Forstall ............ G06F 3/0488 715/236 |
| 2011/0246267 A1 | 10/2011 | Williams et al. |
| 2012/0047135 A1* | 2/2012 | Hansson ........... G06Q 30/0275 707/731 |
| 2012/0054143 A1 | 3/2012 | Doig et al. |
| 2012/0284329 A1* | 11/2012 | van den Oord ....... G06F 17/276 709/203 |
| 2013/0067115 A1* | 3/2013 | Lapanc ............ H04L 67/025 709/245 |
| 2013/0132189 A1 | 5/2013 | St. Pierre |
| 2013/0268548 A1* | 10/2013 | Timm ............ G06F 16/9535 707/765 |
| 2013/0275415 A1* | 10/2013 | Vaughan .......... G06F 16/24578 707/722 |

OTHER PUBLICATIONS

International Preliminary Report on Patentability in International Application No. PCT/US2013/006139, dated Feb. 11, 2016, 6 pages.

* cited by examiner

RESOURCE LOCATOR REMARKETING

CROSS-REFERENCE TO RELATED APPLICATIONS

This application is a continuation of U.S. application Ser. No. 14/693,175, titled "Resources Locator Remarketing", filed Apr. 22, 2015, which is a continuation of U.S. application Ser. No. 13/952,887, titled "Resource Locator Remarketing", filed Jul. 29, 2013, the disclosure of which is incorporated herein by reference in its entirety.

BACKGROUND

This specification relates to content distribution.

The Internet provides access to a wide variety of resources, for example, webpages, images, audio files, and videos. Such access to these resources has enabled opportunities for providing relevant additional content. One example of additional content is advertisements. For example, resources of particular interest to a user can be identified by a search engine in response to a user query. By comparing the user query to a list of keywords specified by a content item provider, such as an advertiser, it is possible to provide relevant advertisements (or other content items) to the user with search results.

Another form of online content serving is remarketing, which allows content item providers to choose particular content items to be shown to users who have performed certain actions at a publisher's website. For example, an advertiser can choose to show a particular advertisement to users who have recently visited the advertiser's website. As these users are likely interested in the advertiser's offerings, they are likely to be interested in the advertised product or service. Accordingly, remarketing can help drive online customers to the advertiser's website.

SUMMARY

In general, one innovative aspect of the subject matter described in this specification can be embodied in methods that include the actions of receiving visitation data from a publisher, the visitation data specifying a device identifier and a resource locator specifying a resource that was previously provided to a user device identified by the device identifier; identifying a content feed associated with the publisher, the content feed including one or more regular expressions, each regular expression specifying a set of matching character strings and having a corresponding set of content items that are eligible to be provided to user devices corresponding to visitation data including one or more resource locators matching one of the one or more regular expressions; identifying, from the regular expressions included in the content feed, a first matching regular expression that matches the resource locator specified by the received visitation data; selecting a content item from the set of content items that corresponds to the first matching regular expression; and providing data that causes presentation of the selected content item to the user device. Other embodiments of this aspect include corresponding systems, apparatus, and computer programs, configured to perform the actions of the methods, encoded on computer storage devices.

These and other embodiments can each optionally include one or more of the following features. Methods may further comprise: obtaining, from a website for the publisher, resource locators for each of a plurality of resources included in the web site; generating, from the resource locators, one or more regular expressions, where each regular expression matches at least one of the resource locators obtained from the website, and wherein each of the resource locators obtained from the website matches at least one of the one or more regular expressions; generating a content feed for the publisher, the content feed including the one or more regular expressions; and providing the content feed to the publisher.

Methods may further comprise receiving, from the publisher, publisher input that specifies, for one or more of the regular expressions included in the content feed, a set of content items.

Methods may further comprise: identifying, from the regular expressions included in the content feed, a second matching regular expression that matches the resource locator; and determining that a first priority of the first matching regular expression is greater than a second priority of the second matching regular expression, and wherein the content item is selected from the set of content items that corresponds to the first matching regular expression based on the determination that the first priority of the first matching regular expression is greater than the second priority of the second matching regular expression.

This method may further comprise determining a priority for each matching regular expression based on a granularity of the regular expression.

The resource locator may specify the location of a resource that was previously visited by the user device.

At least one of the one or more regular expressions may include a uniform resource locator and a metacharacter.

At least one of the one or more regular expressions may include a keyword and a metacharacter.

Particular embodiments of the subject matter described in this specification can be implemented so as to realize one or more of the following advantages. Publishers can specify particular content to be provided to user devices that visit particular resources of the publisher. Because the content management system uses resource locators for matching regular expressions, the content can be identified based on a standard resource locator, without requiring special tags to be added to publisher resources. In addition, publishers may be provided with regular expressions that match the publisher's resources, without requiring initial publisher input. The remarketing process enables publishers to reach users that are likely to be interested in the content items and the products or services offered by the publisher. Providing content items of interest to users, in turns, leads to satisfaction of users' informational needs.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

As described in detail below, a content management system enables publishers to specify particular content to be provided to user devices who visited one or more resources provided by the publisher. When a user device visits a resource provided by the publisher, the content management system is notified of the visitation and selects content to provide to the user device based on the particular resource visited.

For example, the content management system may maintain a content feed for a publisher. The content feed includes regular expressions, which are expressions that specify sets of strings, and corresponding content item identifiers. As described in more detail below, the regular expression, "jump.*" specifies any string that includes the string, "jump;" such as "jumping," "jumped," "high jump," and so on. The regular expression corresponds to an identifier for a content item, such as an identifier for an advertisement. When a user device visits a web page provided by the publisher, the publisher sends the content management system a device identifier for the user device and a uniform resource locator (URL) of the web page visited. The content management system identifies a regular expression that matches the URL and selects the corresponding content item identifier. The selected content item identifier is then associated with the device identifier of the user device, so that when the user device requests a content item, the content item specified by the content item identifier can be provided in response to the request.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Figure 1:
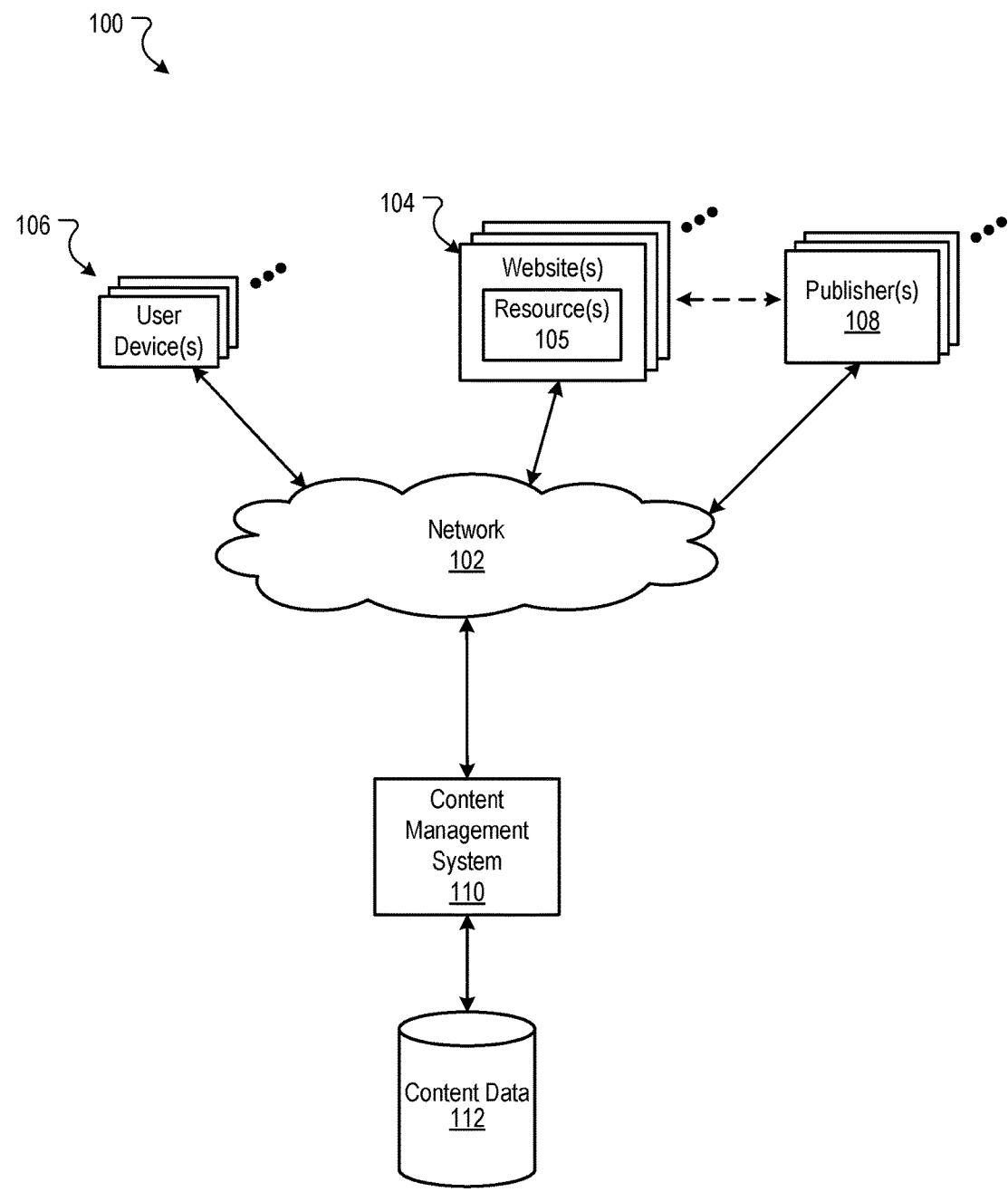
FIG. 1 is a block diagram of an example environment in which resource locator remarketing occurs.

FIG. 1 is a block diagram of an example environment 100 in which resource locator remarketing occurs. A computer network 102, such as a local area network (LAN), wide area network (WAN), the Internet, or a combination thereof, connects publisher websites 104, user devices 106, publishers 108, and the content management system 110. The online environment 100 may include many thousands of publisher web sites 104 and user devices 106.

A website 104 includes one or more resources 105 associated with a domain name and hosted by one or more servers. An example website is a collection of web pages formatted in hypertext markup language (HTML) that can contain text, images, multimedia content, and programming elements, such as scripts. Each website 104 is maintained by a content publisher 108, which is an entity that controls, manages and/or owns the website 104.

A resource 105 is data that can be provided by the publisher 108 over the network 102 and that is associated with a resource locator. Resources include HTML pages, word processing documents, and portable document format (PDF) documents, images, video, and feed sources, to name just a few. The resources can include content, such as words, phrases, pictures, and so on, and may include embedded information (such as meta information and hyperlinks) and/ or embedded instructions (such as scripts).

A user device 106 is an electronic device that is capable of requesting and receiving resources 105 over the network 102. Example user devices 106 include personal computers, mobile communication devices, and other devices that can send and receive data over the network 102. A user device 106 typically includes a user application, such as a web browser, to facilitate the sending and receiving of data over the network 102. The web browser can enable a user to display and interact with text, images, videos, music and other information typically located on a web page at a website on the World Wide Web or a local area network.

The user devices 106 submit requests for resources 105 of a particular website from the publisher of that website. The request may include a unique identifier that identifies the user device 106 that submits the request. The unique identifier can be data from a cookie stored at the user device, or a user account identifier if the user maintains an account with the publisher, or some other identifier that identifies the user device 106 or the user using the user device.

The publisher of the web site 104 hosting the resource receives the request for the resource from the user device 106 and provides the resource to the requesting user device 106. The requesting user device may then render the resource for display to a user.

The content management system 110 facilitates the provisioning of content items with the resources 105. For example, the content management system 110 allows publishers to define selection rules that take into account attributes of the particular user to provide content items for the users. Example selection rules include keyword rules, in which content providers provide bids for keywords that are present in either search queries sent to a search engine or webpage content. Content items that are associated with keywords having bids that result in an impression being awarded in response to an auction (or another selection process) are selected for displaying in content item slots of resources. Content items can be provided for many different resources, such as a search results page resource, or one of the resources 105 hosted at publisher websites 104.

A content item slot is a portion of a resource that is populated with a requested content item. The content item slot can be populated, for example, in response to a request for the content item that is initiated by way of the user device executing code corresponding to the content item slot when the resource is rendered at the user device. As used throughout this document, a content item is a discrete unit of content that is provided for presentation with a resource from which a request for the content item was initiated. Example content items include audio files, video files, advertisements, or other units of content that can be presented with a requesting resource.

When a user of a user device 106 selects a content item, the user device 106 generates a request for a landing page of the content item, which is typically a webpage of the content item provider. For example, an advertiser may have a website that includes web pages, some of which are landing pages for the advertisements of the advertisers.

Content items can be provided for many different resources, such as the resources 105 of the publishers 108, or on a search results page resource. For example, assume that a resource 105 from a publisher 108 includes instructions that cause the user device to request an informational video from the content management system 110. The request can include a publisher identifier and, optionally, keyword identifiers related to the content of the resource 105. The content management system 110, in turn, uses the information in the request to provide an informational video to the particular user device.

With respect to a search results page, the user device renders the search results page and sends a request to the content management system 110, along with one or more keywords related to the query that the user provide to the search engine. The content management system 110, in turn, provides advertisements to the particular user device based, at least in part, on the information in the request.

The content management system 110 includes a data storage system that stores content data 112, such as campaign data and performance data for content items. For example, the campaign data stores content items, selection information, and budgeting information for content item providers. The performance data stores data indicating the performance of the content items that are served. Such performance data may include, for example, click through rates for content items, the number of impressions for content items, and the number of conversions for content items. Other performance data can also be stored (e.g., total revenue generated by a content item or return on investment).

The content item data 112 may be used as input parameters to a content item selection process. For example, the content management system 110, in response to a request for content items, can conduct an auction to select content items that are provided in response to the request. The content items may be ranked according to a score that, in some implementations, is a value determined based on a content item bid and one or more parameters specified in the content item data 112. The highest ranked content items resulting from the auction are selected and provided to the requesting user device.

Content item remarketing is a method for providing content items to user devices based, at least in part, on some previous activity of the user devices. For example, the publisher of a news website may wish to provide advertisements or other content to users who previously visited the news website. In some situations, a publisher may wish to select content items specifically designed to meet a user's informational need based on resource was visited. For example, if a user visits the sports section of the news website, the publisher may wish to provide that user with content related to sports, while a user who visits a financial section of the news website would be better served with content related to finances.

Resource locator remarketing allows publishers to remarket based on the resource locators of resources visited by particular user devices. In some implementations, publishers insert code into their resources that causes corresponding resource locators and device identifiers to be recorded when the devices associated with the device identifiers visit the resources. For example, each web page of a publisher's website can include a script that causes a visiting user device or the publisher to send the URL of the web page to the content management system 110 with a device identifier for the user device. When the user device subsequently requests a content item from the content management system 110, a content item can be provided to the user device based on the URL.

To facilitate resource locator remarketing, the content management system 110 stores a content feed for some publishers 108 and/or websites 104. The content feed includes regular expressions for matching resource locators and content items that correspond to the regular expressions. In some implementations, when a user device 106 requests a resource 105 from a publisher 108, the publisher provides the content management system 110 with a device identifier for the requesting user device and a resource locator that specifies the location of the requested resource, e.g., the URL. The content management system 110 identifies a regular expression that matches the resource locator in the publisher's content feed, and provides a corresponding content item to the user device. Content feed generation and resource locator remarketing are discussed in further detail below.

Figure 2:
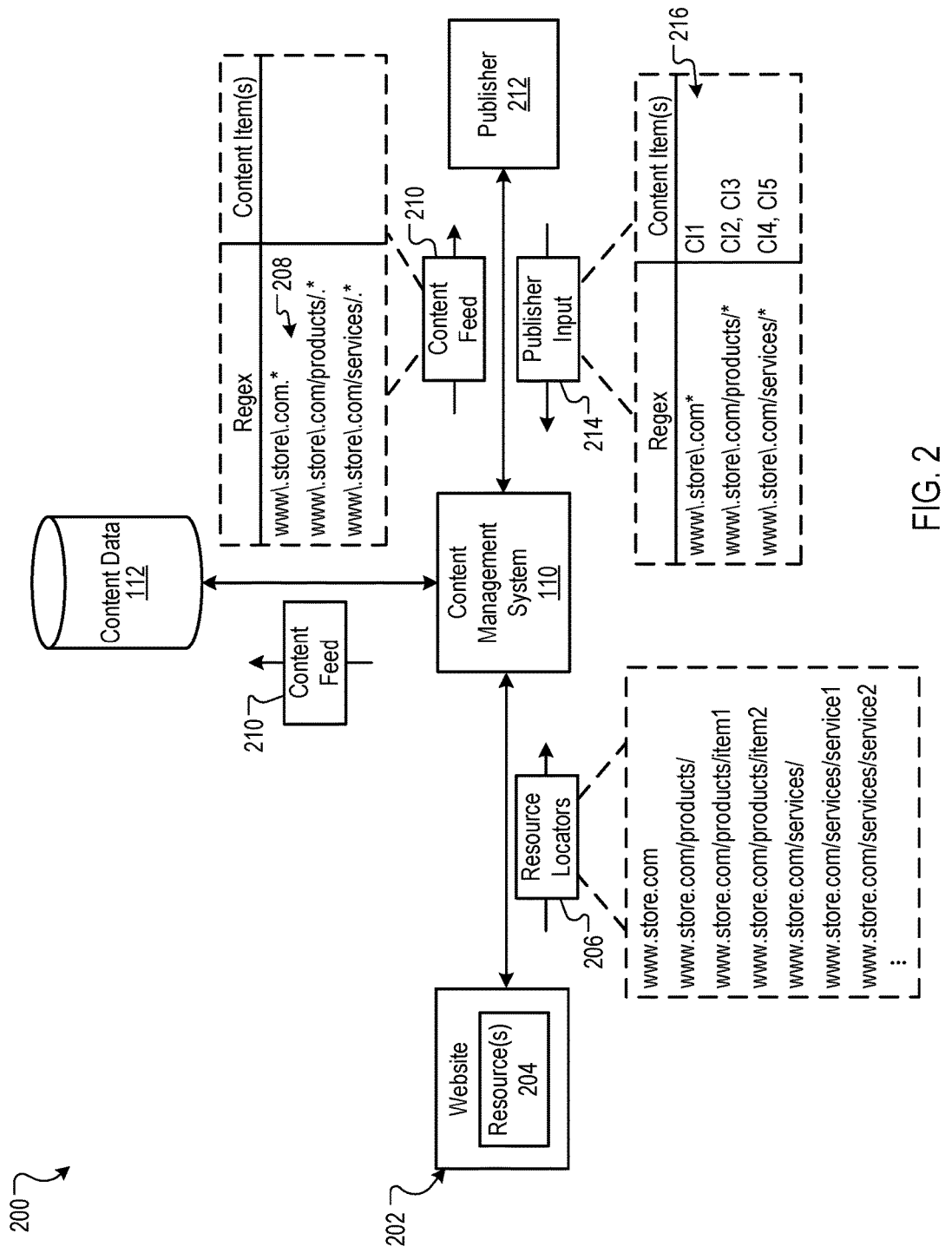
FIG. 2 is a block diagram of an example data flow for generating a content feed for a publisher.

FIG. 2 is block diagram of an example data flow 200 for generating a content feed for a publisher. In the example data flow 200, the content management system 110 obtains resource locators 206 from a publisher's website 202. The resource locators 206 may be obtained in a number of ways. For example, the content management system 110 may crawl each of the resources 204 included in the website 202 to identify URLs for each of the resources 204. As another example, the content management system 110 may provide publishers with an interface through which resource locators can be submitted.

The content management system 110 uses the resource locators 206 to generate regular expressions 208. Regular expressions are strings of one or more characters. Regular expressions may include metacharacters, which are characters with symbolic meaning. For example, the metacharacter '*' may match the preceding character 0 or more times, while the metacharacter '.' may match any single character. Each regular expression 208 ("Regex") matches at least one of the resource locators 206 obtained from the website 202. In the example regular expressions 208, each of the resource locators 206 also matches at least one regular expression. For example, the regular expression "www\.store\.com.*" matches each of the example resource locators 206, because the regular expression will match any string that includes "www.store.com"—the "." metacharacter represents any character, or no character, the "*" metacharacter represents 0 or more of the previous character (which in this case is the "."—any character or no character), and the "\" metacharacters are escape characters that prevent the "." in "www-.store.com" from being treated as the metacharacter "."— e.g., the "." characters preceded by a "\" are treated literally, requiring a "." for a match, as opposed to being treated as a "." metacharacter that would match any character.

The foregoing regular expression is an example. The regular expression may be in many different forms. For example, the regular expression could be "www\.store\.com"—without the ".*"—and it would match the same character strings. Depending on implementation details, such as programming language, different rmetacharacters could be used, and some may or may not be necessary. For example, in some languages, the regular expression "www.store.com*" may match the same strings as the above regular expression.

In the example data flow 200, the example regular expression "www\. store\. com/products/.*" matches the resource locators "www.store.com/products/" "www.store.com/products/item1" and "www.store.com/products/item2," while the example regular expression "www\.store\.com/services/.*" matches the resource locators "www.store.com/services/" "www.store.com/services/service1" and "www.store.com/services/service2."

The regular expressions 208 may be generated using various methods. In some implementations, the content management system 110 may create a regular expression for each directory, e.g., "products" is one directory, while "services" is another. These may be further broken down by sub-directory, if applicable. In some implementations, whether a regular expression is created for a directory or sub-directory may depend on how many resource locators are within the directory or sub-directory. For example, a website may have thousands of web pages in hundreds of directories and subdirectories. In this situation, the content management system 110 may set a threshold number of resources, e.g., 10 resources, and any directory or sub-directory with less than the threshold number of resources will not be eligible for its own regular expression. Resource thresholds are one example method for generating regular expressions, and they may be predetermined, machine learned, and/or dependent on the number of resources, directories, and sub-directories of a website.

In some implementations, regular expressions may be created for each resource, directory, and sub-directory of a website. For example, the content management system 110 may crawl every directory and sub-directory of a website, creating a regular expression for each resource, subdirectory, and directory.

The content management system 110 generates a content feed 210 for the publisher 212 of the website 202. The content feed 210 includes each of the generated regular expressions 208. The content feed 210 is then provided to the publisher 212. In some implementations, the content feed 210 is stored in the content data 112 for later retrieval, e.g., retrieval in response to a request from the publisher 212.

The publisher 212 provides input 214 to the content management system 110, and the input 214 specifies content items 216 for at least one of the regular expressions included in the content feed 210. In some implementations, the publisher 212 can edit the regular expressions by adding, removing, or changing the existing regular expressions. The publisher 212 can also designate, for each regular expression, one or more content items. Once content items are specified for the regular expressions of the content feed 210, the content management system 110 may store the updated content feed 210 in the content data 112 data store.

By way of example, the publisher 212 may have advertisements that it would like to specify for delivery to users who visited particular web pages. For example, "CI1" may be a general advertisement for the products and services offered at the website, and the publisher 212 has specified that the advertisement is to be provided to user devices that visit a web page that matches the regular expression, "www\.store\.com.*" while "CI2" and "CI3" may be advertisements for products offered at the website, and the publisher 212 has specified that they are to be provided to user devices that visit any web page that matches the regular expression, "www\.store\.com/products/.*" and "CI4 " and "CI5" may be advertisements for services offered at the website, and the publisher 212 has specified that they are to be provided to user devices that visit any web page that matches the regular expression, "www\.store\.com/services/.*"

In some implementations, regular expressions may be keywords. For example, the keywords "products" and "services" may be included in the content feed. These keyword regular expressions may match any resource locators that include the corresponding keyword. As with the resource locator based regular expressions described above, keyword regular expressions may be generated by the content management system 110 and/or a website's publisher.

The data flow 200 described above is an example process, and other methods for creating content feeds and generating regular expressions may be used. In some implementations, content feeds may be generated by a publisher. For example, the content management system may provide the publisher with an interface through which regular expressions can be created and associated with content items. Once a content feed that includes regular expressions and corresponding content items has been generated, the content management system may use the content feed to provide user devices with content items.

Figure 3:
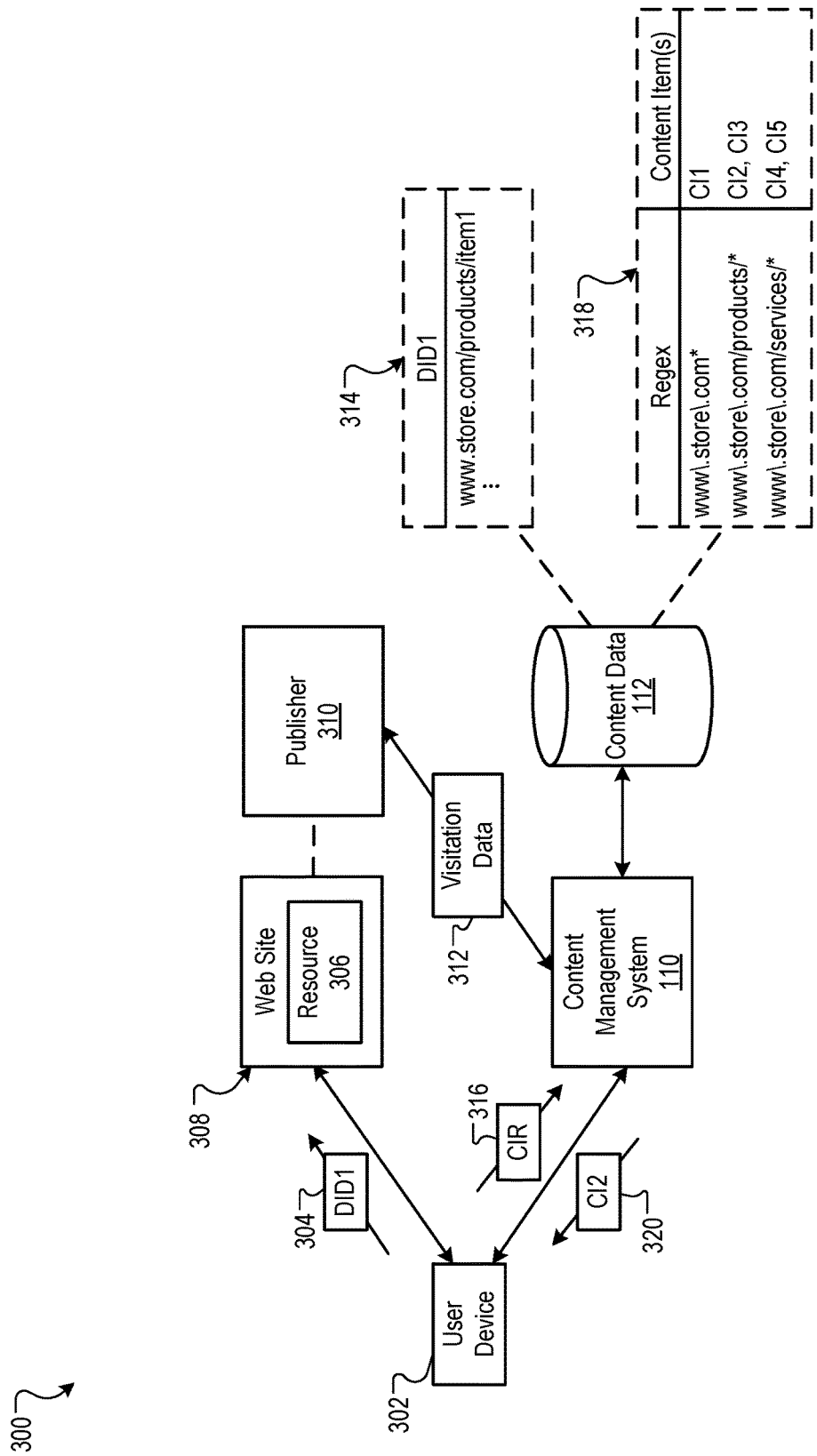
FIG. 3 is a block diagram of an example data flow for serving a content item based on resource locator remarketing.

FIG. 3 is a block diagram of an example data flow 300 for serving a content item based on resource locator remarketing. A user device 302 requests a resource 306 from a publisher's website 308, and the request includes a device identifier 304. For example, a user device may send a request for the web page located at "www.store.com/products/item1" to the publisher 310, and the web page request includes a device identifier, "DID1," for the user device 302.

The publisher 310 provides visitation data 312 to the content management system 110. The visitation data 312 specifies the device identifier 304 and the resource locator of the requested resource 306. Using the above example, the visitation data would include the device identifier, "DID1," and the resource locator, "www.store.com/products/item1." In some implementations, other data may be included in the visitation data 312, such as a publisher identifier that identifies the publisher 310.

In some implementations, the publisher 310 includes, for each resource included in its website, data that causes the publisher to send visitation data to the content management system 110. For example, a web page may include a script that, when executed, causes the publisher 310 to send the visitation data. In some implementations, the data included in a resource causes a user device to provide the visitation data to the content management system. For example, a resource may include code that, when executed by the user device, causes the user device to send its device identifier and the resource locator of the resource to the content management system.

In some implementations, upon receipt of the visitation data 312, the content management system 110 stores data in a visitation record 314 that indicates that the particular device identifier 304 visited the resource 306. In the example data flow 300, the visitation record 314 indicates that the user device identified by the identifier, "DID1," visited the web page at "www.store.com/products/item1." In some implementations, the visitation record 314 is stored in the content data 112 data store.

In some implementations, the content management system 110 receives a content item request 316 from the user device 302. The content item request 316 includes the device identifier 304 of the user device 302. Upon receipt of the content item request 316 and the included device identifier, the content management system 110 identifies a resource locator included in the visitation record 314 associated with the device identifier. In the example data flow 300, the content management system 110 locates the visitation record 314 associated with the device identifier, "DID1," and identifies "www.store.com/products/item1" as a resource locator visited by the requesting user device 302.

The content management system 110 identifies a content feed 318 associated with the publisher 310. For example, the content management system 110 uses the visitation record 314 to identify the content feed 318 for the publisher 310 of the resource 306 referenced in the visitation record 314. The content feed 318 includes regular expressions that each have a corresponding set of content items. In the example data flow 300, the content feed 318 is the same as the content feed described above with reference to FIG. 2.

From the regular expressions included in the content feed 316, a matching regular expression is identified. A matching regular expression is a regular expression that matches the resource locator that was included in the visitation data 312. In the example data flow 300, the resource locator was also included in the visitation record 314 for the device identifier. For example, the content management system may identify the regular expression—"www\.store\.com/products/.*"—as a matching regular expression for the resource locator, "www.store.com/products/item1."

The content management system 110 selects a content item from the set of content items that corresponds to a matching regular expression. For example, content items "C2" and "C3" are in the set of content items that corresponds to the regular expression, "www\.store\.com/products/.*." One of the content items may be selected by the content management system 110. When a set includes only one content item, only that content item is selected. Various methods exist for selecting one content item from a set of multiple content items, e.g., random selection, selection according to a certain order, selection according to a number of time a content item has previously been viewed by a user device or user devices.

In some implementations, multiple content items in a set may be selected. For example, if a set includes two content items, both may be selected. In some implementations, content items selected from the content feed 318 are submitted to a content item selection process, such as the content item auction described above with respect to FIG. 1. In some implementations, the content items selected from a content feed—e.g., remarketing content items—may be given priority, or a score boost, when submitted to an auction process.

In some implementations, the content management system 110 identifies multiple matching result expressions. In the example data flow 300, the content feed includes a second regular expression—"www\.store\.com.*"—that matches the resource locator, www.store.com/products/item1. In situations where multiple regular expressions match, content items that correspond to one, some, or all of the matching regular expressions may be selected.

In some implementations, the content management system 110 determines a priority for each matching regular expression. For example each regular expression may be assigned a relative priority based on its granularity, e.g., the number of directories or sub-directories. Regular expressions that are less specific or that have less directories or sub-directories may have a lower priority than those that are more specific or those with more directories and sub-directories. In the example data flow 300, two regular expressions match, and the priority of the regular expression, "www\.store\.com/products/.*" has a higher priority than the regular expression, "www\.store\.com.*," because the first regular expression is more specific—e.g., it has a specific directory, whereas the second regular expression does not. Other methods can be used to determine regular expression priority, including, for example, manual priority rankings assigned by the publisher.

The content management system 110 provides data to the user device 302 that causes the selected content item to be displayed on the user device 302. In the example data flow 300, content item "CI2" 320 is selected by the content management system 110 and provided to the user device 302. By way of example, "CI2" 320 may be an advertisement for a particular product sold on the website 308. The advertisement may be presented in an advertisement slot of a resource rendered at the user device 302.

The example data flow 300 illustrates one method for providing remarketed content items to user devices, and other methods may be used. For example, instead of a visitation record 314, the content management system 110 may receive the visitation data 312, select a content item in the content feed 318, and provide the content item to the user device 302 without storing the visitation in a visitation record. In some implementations, the content management system may select a content item from the content feed 318 and store it in a separate feed specific to the device identifier.

In some implementations, multiple resource locators from different publishers may be stored in a device identifier's visitation record. The content management system can select one, some, or all of the resource locators in the visitation record when selecting a content item to provide to the user device. Various methods may be used to determine which resource locator(s) to select. For example, the n most recently added resource locators may be chosen, or the n most recently added resource locators that each reference a unique website, where n is a specified integer. In situations where multiple content items from multiple content feeds are selected, they may be provided to a content selection process, such as the content auction described with respect to FIG. 1, to determine which content item(s) to provide to the user device.

Figure 4:
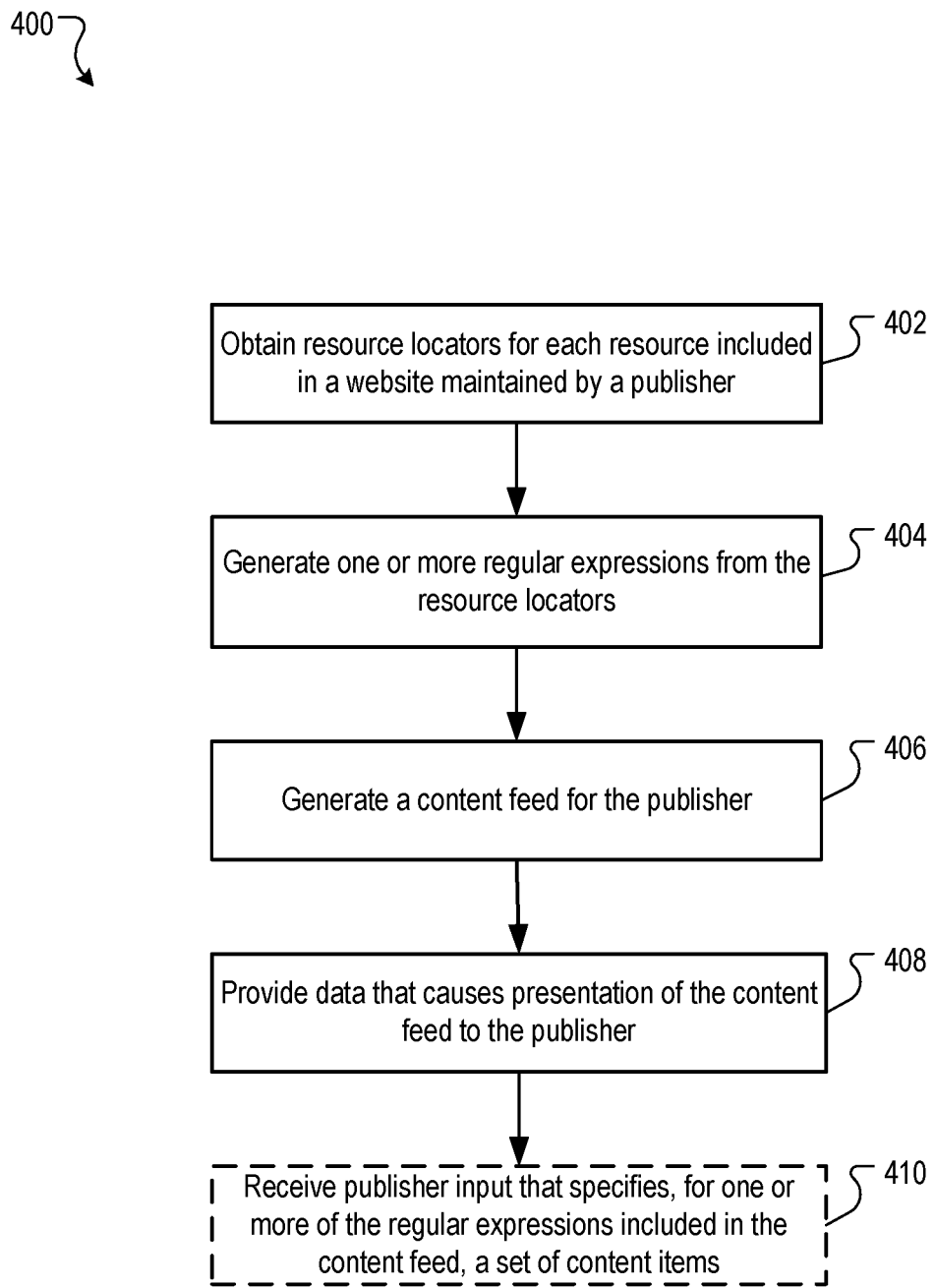
FIG. 4 is a flow diagram of an example process for generating a content feed.

FIG. 4 is a flow diagram of an example process 400 for generating a content feed. The example process 400 may be performed by data processing apparatus, such as a content management system.

Resource locators for each resource included in a website maintained by a publisher are obtained (402). For example, a content management system may crawl web pages and other resources of a publisher's website to obtain URL's for each resource included in the website.

One or more regular expressions are generated from the resource locators (404). Each regular expression matches at least one of the resource locators obtained from the website. In some implementations, each of the resource locators obtained from the website match at least one of the regular expressions. For example, the content management system may generate one regular expression that matches a home page of a website and a regular expression for each public directory of the website.

A content feed is generated for the publisher (406). The content feed includes each of the generated regular expressions. In some implementations, the content feed is stored in a data storage device, to be accessed later upon a publisher's request for the content feed.

Data that causes presentation of the content feed is provided to the publisher (408). For example, the content management system may present a website publisher with an interface to access and update the content feed.

In some implementations, publisher input that specifies, for one or more of the regular expressions included in the content feed, a set of content items is received (410). For example, the publisher may identify specific sets of advertisements for each regular expression. The content items specified by the publisher are eligible to be provided to user devices that have visited a resource that matches the corresponding regular expression.

Figure 5:
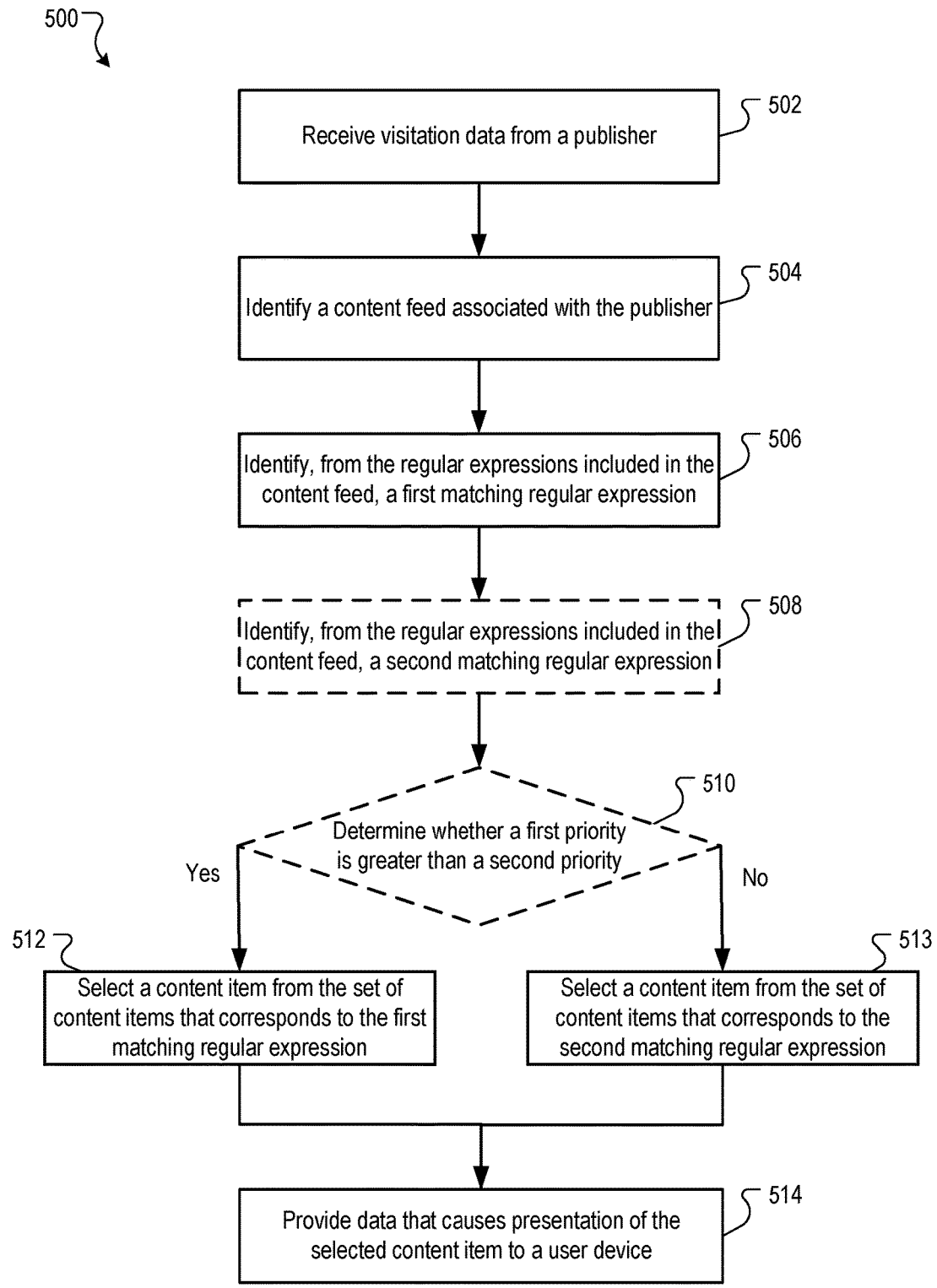
FIG. 5 is a flow diagram of an example process for providing a content item based on resource locator remarketing.

FIG. 5 is a flow diagram of an example process 500 for providing a content item based on resource locator remarketing. The example process 500 may be implemented by data processing apparatus, such as the content management system.

Visitation data is received from a publisher (502). The visitation data specifies a device identifier and a resource locator of a resource provided to a user device corresponding to the device identifier. For example, when a user device visits a web page, it provides a device identifier to the publisher of the web page, and the publisher provides the device identifier and the URL of the web page visited to the content management system.

A content feed associated with the publisher is identified (504). The content feed includes one or more regular expressions, and each regular expression specifies a set of matching character strings has a corresponding set of content items that are eligible to be provided to user devices corresponding to visitation data including one or more resource locators matching one of the one or more regular expressions. For example, the content feed may include keyword-based and URL-based regular expressions specified by a publisher and corresponding advertisements.

From the regular expressions included in the content feed, a first matching regular expression is identified (506). The first matching regular expression matches the resource locator specified by the received visitation data. For example, if a regular expression is a keyword, and the keyword exists in the URL of web page visited by the user device, that regular expression may be considered a matching regular expression.

In some implementations, a second matching regular expression is optionally identified from the regular expressions included in the content feed (508). For example, in addition to a keyword-based regular expression, the URL of the web page visited by the user device may also match a URL-based regular expression. While portions of the example process 500 are described with respect to two matching regular expressions, any number of matching regular expressions may be identified.

In some implementations, the process 500 optionally determines whether a first priority of the first matching regular expression is greater than a priority of the second matching regular expression (510). In some implementations, the priority is based on the type of regular expression. For example, a keyword-based regular expression may be considered a higher priority than a URL-based regular expression, or vice versa. In addition, a publisher can assign priority to the regular expressions of a content feed.

In situations where the first priority is greater than the second priority, a content item is selected from the set of content items that corresponds to the first matching regular expression (512). In situations where the first priority is not greater than the second priority, a content item is selected from the set of content items that corresponds to the second matching regular expression (513).

In situations with multiple matching regular expressions, a content item is selected from the set of content items that corresponds to the matching regular expression with the highest priority. For example, if a matching keyword-based regular expression has a higher priority than a matching URL-based regular expression, an advertisement associated with the keyword-based regular expression may be selected.

Data that causes presentation of the selected content item is provided to a user device (514). The user device is the user device identified by the device identifier specified by the visitation data. For example, when rendering a web page that includes advertisement slots, the user device may request advertisements from the content management system. In turn, the content management system can provide one of the remarketed advertisements from a publisher's content feed to the user device based on that user device having previously visited a particular web page of the publisher.

Figure 6:
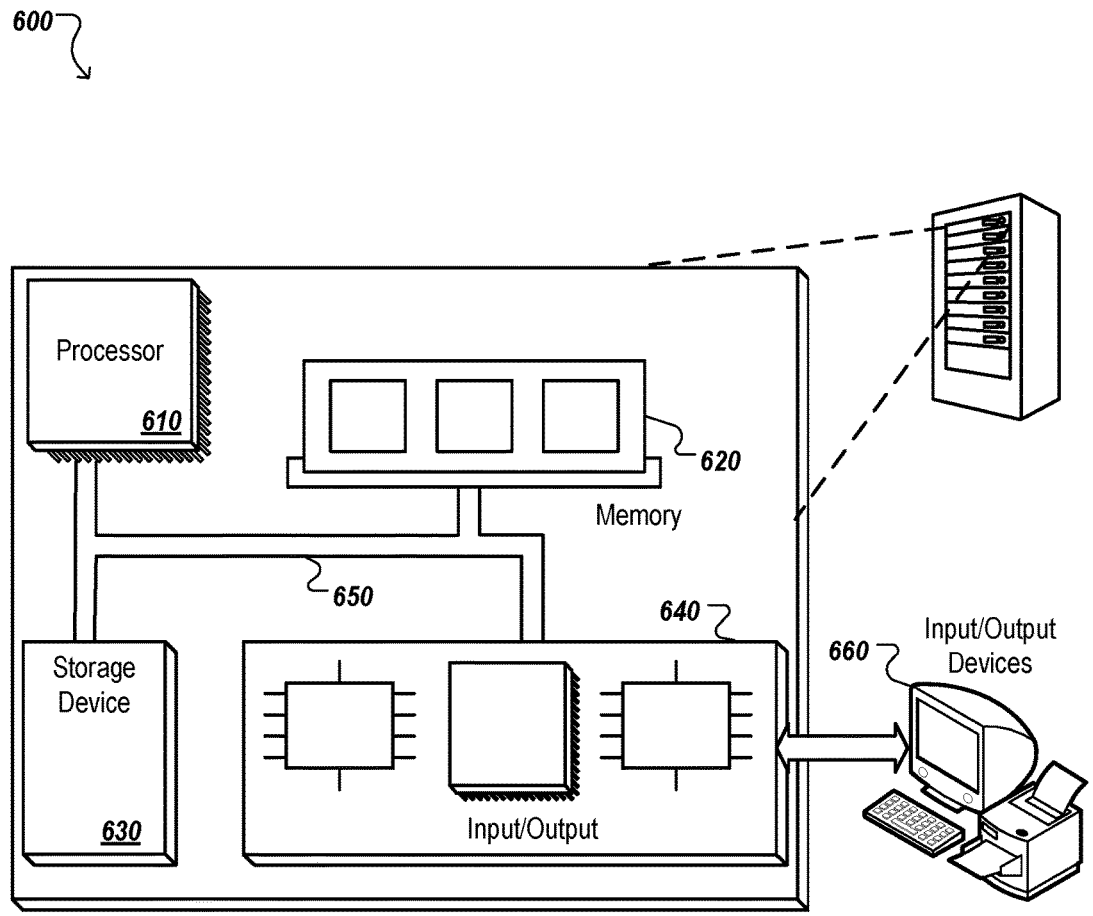
FIG. 6 is a block diagram of an example data processing apparatus.

FIG. 6 is a block diagram of an example data processing apparatus 600. The system 600 includes a processor 610, a memory 620, a storage device 630, and an input/output device 640. Each of the components 610, 620, 630, and 640 can, for example, be interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 can, for example, include a hard disk device, an optical disk device, or some other large capacity storage device.

The input/output device 640 provides input/output operations for the system 600. In one implementation, the input/output device 640 can include one or more network interface devices, e.g., an Ethernet card, a serial communication device, e.g., an RS-232 port, and/or a wireless interface device, e.g., an 802.11 card. In another implementation, the input/output device can include driver devices configured to receive input data and send output data to other input/output devices, e.g., keyboard, printer and display devices 660. Other implementations, however, can also be used, such as mobile computing devices, mobile communication devices, set-top box television client devices, etc.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   obtaining, by one or more data processing apparatus, resource locators for each resource included in a web site maintained by a publisher;
   generating, by the one or more data processing apparatus, one or more regular expressions from the resource locators;
   generating, by the one or more data processing apparatus and for the publisher, a content feed that includes the one or more regular expressions, each regular expression specifying a set of matching character strings and having a corresponding set of content items that are eligible to be provided to user devices; and
   providing, by the one or more data processing apparatus, data that causes presentation of the content feed to the publisher.

2. The method of claim 1, comprising:
   receiving, by the one or more data processing apparatus, publisher input that specifies, for each of the one or more regular expressions included in the content feed, the corresponding set of content items.

3. The method of claim 2, comprising:
   determining, by the one or more data processing apparatus, that a user navigated to a given resource that corresponds to one of the one or more regular expressions that correspond to a given set of content items; and
   providing, to the user and by the one or more data processing apparatus, the given set of content items.

4. The system of claim 2, wherein the operations further comprise:
   determining, by the one or more data processing apparatus, that a user navigated to a given resource that corresponds to one of the one or more regular expressions that correspond to a given set of content items; and
   providing, to the user and by the one or more data processing apparatus, the given set of content items.

5. The method of claim 1, wherein obtaining, by the one or more data processing apparatus, the resource locators for each resource included in a website maintained by the publisher comprises:
   obtaining the resources locators by crawling resources in the website maintained by the publisher.

6. The method of claim 1, wherein generating, by the one or more data processing apparatus, the one or more regular expressions from the resource locators comprises:
   generating a first regular expression that corresponds to a home page of the website maintained by the publisher; and
   generating a second regular expression for each public directory of the website maintained by the publisher.

7. The method of claim 1, wherein the presentation of the content feed is a user interface that includes a selectable option to modify the content feed.

8. The method of claim 1, wherein:
   the resource locators are URLs,
   the resources are mark-up language pages, word processing documents, portable document format documents, images, videos, or feed sources, and
   the website is a collection of web pages that include text, images, multimedia content, or programming elements.

9. A system comprising:
   one or more computers and one or more storage devices storing instructions that are operable, when executed by the one or more computers, to cause the one or more computers to perform operations comprising:
   obtaining, by one or more data processing apparatus, resource locators for each resource included in a web site maintained by a publisher;
   generating, by the one or more data processing apparatus, one or more regular expressions from the resource locators;
   generating, by the one or more data processing apparatus and for the publisher, a content feed that includes the one or more regular expressions, each regular expression specifying a set of matching character strings and having a corresponding set of content items that are eligible to be provided to user devices; and
   providing, by the one or more data processing apparatus, data that causes presentation of the content feed to the publisher.

10. The system of claim 9, wherein the operations further comprise:
    receiving, by the one or more data processing apparatus, publisher input that specifies, for each of the one or more regular expressions included in the content feed, the corresponding set of content items.

11. The system of claim 9, wherein obtaining, by the one or more data processing apparatus, the resource locators for each resource included in a website maintained by the publisher comprises:
    obtaining the resources locators by crawling resources in the website maintained by the publisher.

12. The system of claim 9, wherein generating, by the one or more data processing apparatus, the one or more regular expressions from the resource locators comprises:

generating a first regular expression that corresponds to a home page of the website maintained by the publisher; and generating a second regular expression for each public directory of the website maintained by the publisher.

13. The system of claim 9, wherein the presentation of the content feed is a user interface that includes a selectable option to modify the content feed.

14. The system of claim 9, wherein:
the resource locators are URLs,
the resources are mark-up language pages, word processing documents, portable document format documents, images, videos, or feed sources, and
the website is a collection of web pages that include text, images, multimedia content, or programming elements.

15. A non-transitory computer-readable medium storing software comprising instructions executable by one or more computers which, upon such execution, cause the one or more computers to perform operations comprising:
obtaining, by one or more data processing apparatus, resource locators for each resource included in a website maintained by a publisher;
generating, by the one or more data processing apparatus, one or more regular expressions from the resource locators;
generating, by the one or more data processing apparatus and for the publisher, a content feed that includes the one or more regular expressions, each regular expression specifying a set of matching character strings and having a corresponding set of content items that are eligible to be provided to user devices; and
providing, by the one or more data processing apparatus, data that causes presentation of the content feed to the publisher.

16. The medium of claim 15, wherein the operations further comprise:
receiving, by the one or more data processing apparatus, publisher input that specifies, for each of the one or more regular expressions included in the content feed, the corresponding set of content items.

17. The medium of claim 15, wherein obtaining, by the one or more data processing apparatus, the resource locators for each resource included in a website maintained by the publisher comprises:
obtaining the resources locators by crawling resources in the website maintained by the publisher.

18. The medium of claim 15, wherein generating, by the one or more data processing apparatus, the one or more regular expressions from the resource locators comprises:
generating a first regular expression that corresponds to a home page of the website maintained by the publisher; and
generating a second regular expression for each public directory of the website maintained by the publisher.

19. The medium of claim 15, wherein the presentation of the content feed is a user interface that includes a selectable option to modify the content feed.

20. The medium of claim 15, wherein:
the resource locators are URLs,
the resources are mark-up language pages, word processing documents, portable document format documents, images, videos, or feed sources, and
the website is a collection of web pages that include text, images, multimedia content, or programming elements.

* * * * *